Dec. 11, 1962  H. J. JEZEK  3,067,561
COTTON STRIPPER
Filed May 5, 1961  3 Sheets-Sheet 1
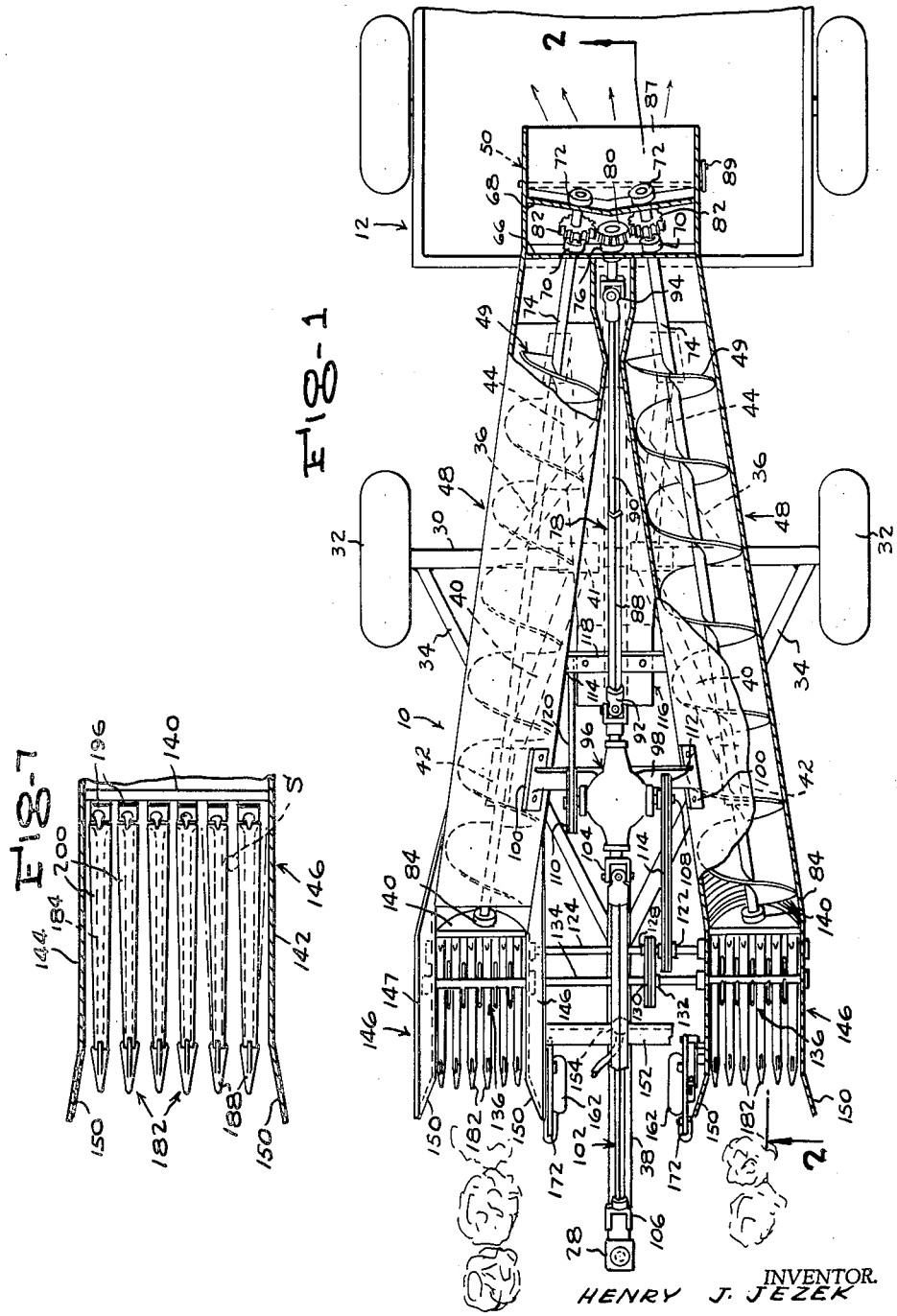
INVENTOR.
HENRY J. JEZEK
BY
McMorrow, Berman & Davidson
ATTORNEYS Dec. 11, 1962  H. J. JEZEK  3,067,561
COTTON STRIPPER
Filed May 5, 1961  3 Sheets-Sheet 2
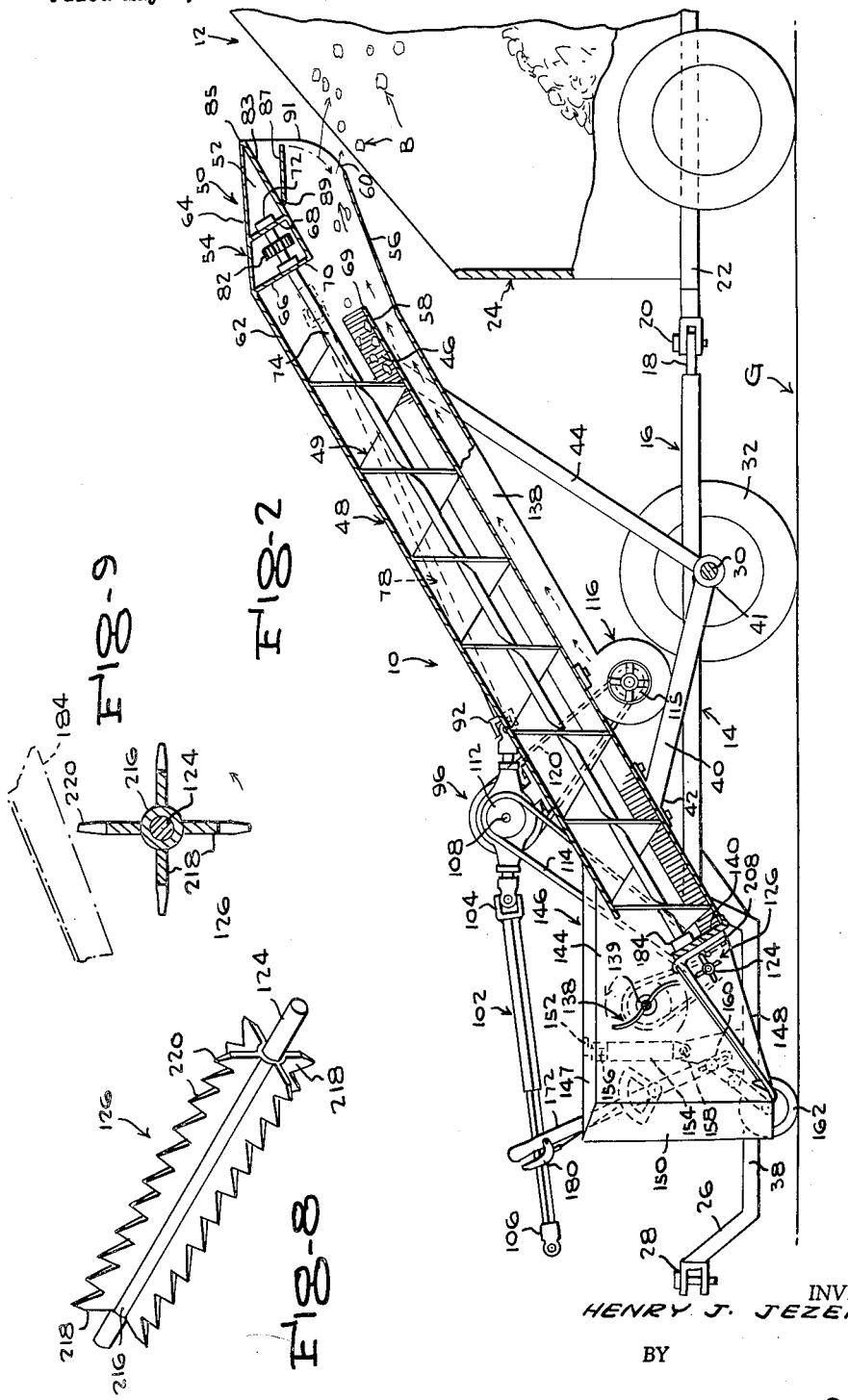
INVENTOR.
HENRY J. JEZEK
BY
McMorrow, Berman + Davidson
ATTORNEYS

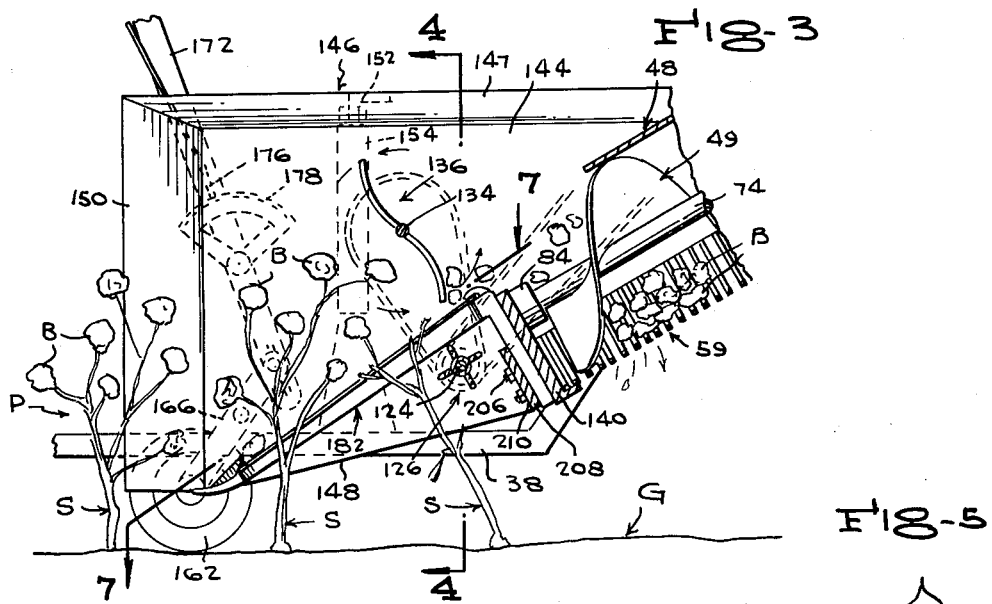
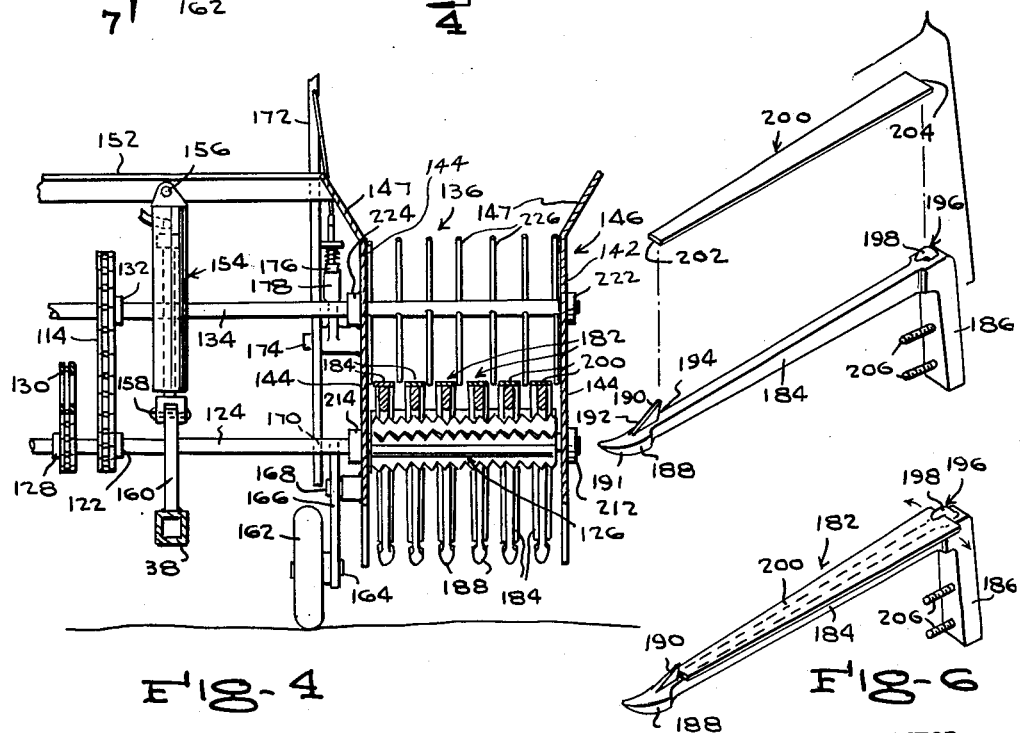

United States Patent Office 3,067,561
Patented Dec. 11, 1962

3,067,561
COTTON STRIPPER
Henry J. Jezek, Rte. 1, Mart, Tex.
Filed May 5, 1961, Ser. No. 108,191
9 Claims. (Cl. 56—34)

This invention relates to an improved tractor-drawn tractor-powered cotton stripper.

The primary object of the invention is the provision of a more efficient high-speed cotton stripper of the kind indicated, which is more reliable and trouble-free, and hence, more economical in operation.

Another object of the invention is the provision of a cotton stripper of the character indicated above which is simpler in construction and is composed of a smaller than usual number of parts.

A further object of the invention is the provision, in a cotton stripper of the character indicated above which utilizes auger elevators, which do away with the complicated and easily clogged components characterizing other forms of elevators, the unclogging and servicing of which is labor and time-consuming and reduces the overall efficiency and economy of operation.

Other important objects and advantageous features of the invention will be apparent from the following description and the accompanying drawings, wherein, for purposes of illustration only, a specific form of the invention is set forth in detail.

In the drawings:

FIGURE 1 is a top plan view of a cotton stripper of the present invention, portions of which are broken away and in section to show internal mechanism, the stripper being shown in relation to a towed cotton-receiving vehicle;

FIGURE 2 is a vertical longitudinal section, taken on the line 2—2 of FIGURE 1, the cotton-receiving vehicle being partly broken away and in section;

FIGURE 3 is an enlarged fragmentary side elevation of the intake end of the stripper, portions being broken away and in section, and cotton plant stalks and bolls being shown, in phantom lines, in relation to stripper mechanism;

FIGURE 4 is a fragmentary vertical transverse section taken on the line 4—4 of FIGURE 3;

FIGURE 5 is a further enlarged exploded perspective view of a self-adjusting stripper tooth;

FIGURE 6 is a perspective view, on the scale of FIGURE 5, showing the self-adjusting plate of the stripper tooth in place thereon;

FIGURE 7 is a fragmentary horizontal section taken on the line 7—7 of FIGURE 3;

FIGURE 8 is an enlarged perspective view of a clearer rotor; and,

FIGURE 9 is a transverse section taken through FIGURE 8.

Referring in detail to the drawings, wherein like and related numerals designate like parts throughout the several views, the illustrated cotton stripper 10, is shown as preceding and as drawing a cotton-receiving vehicle 12, into which cotton bolls B are directly discharged by the stripper 10. A suitable tractor (not shown) precedes the stripper 10, and the stripper is drawn over the ground by the tractor and is powered from a power take-off of the tractor.

The stripper 10 comprises a frame 14 comprising a horizontal longitudinal central member 16, having a short draft tongue 18, on its rear end, to make a hitch connection, as indicated at 20, with the draw bar 22 of the cotton-receiving vehicle 12, which has an open-top body 24. At the forward end of the central member 16 is a kick-up 26 having a hitch clevis 28, on its front end, for connection to the draw bar of an associated tractor.

Fixed, at its midlength point, to the central member 16, at a location nearer to the rear end of the central member than to its forward end, is a transverse axle 30, having relatively large diameter ground-engaging wheels 32 journalled on its ends. Fixed to and extending forwardly and laterally inwardly from the axle 30, are forward braces 34, which, at their forward ends, are fixed to auger tubes 48, and rear braces 36 extend to the central member 16 from points inwardly of the forward braces 34. As shown in FIGURE 2, a portion 38 between the kick-up 26 and a midlength point of the main member 16 is downwardly offset, relative to the plane of the main member. Pivoted to the axle 30, as at 41, and reaching upwardly therefrom at a slight angle, are forwardly divergent forward support arms 40, which have auger tube supporting brackets 44 on their upper ends.

Mounted on brackets 42 and 46 of related support arms, are forwardly divergent and forwardly and downwardly angled auger tubes 48 containing auger screws 49, and the tubes, at their elevated rear ends, meet and open to a common discharge housing chamber 50. The discharge chamber 50 is made up of rearward extensions 52 of the outer side walls of the tubes 48, a rearward extension 54 of their top walls, and a bottom wall 56 which is spaced downwardly from the bottom walls 58 of the tubes 48 and extends rearwardly from the rear ends 60 of the bottom walls, as shown in FIGURE 2. The bottom walls 58, as shown, in FIGURE 3, are provided between their ends, with open gratings 59, through which debris carried into the tubes 48 with bolls B is adapted to drop out to the ground, rather than being carried further along the tubes and into the housing 50. The chamber top wall 54 has a forward portion 62 which is disposed at the same angle as the top walls of the auger tubes, and a rear portion 64 which is substantially horizontal. Suitably fixed to the underside of the top wall portion 64 and extending across the chamber 50, are angled forward and rear plates 66 and 68, which carry laterally spaced forward and rear bearings 70 and 72, respectively, for the rear ends of the auger screw shafts 74 in the auger tubes 48. The forward plate 66 further carries a bearing 76, located between the forward bearings 70, for the rear end of a single drive shaft 78, for the screw shafts 74, the related shafts having meshed pinions 80 and 82 thereon, as shown in FIGURE 1. The forward ends of the auger screw shafts 74 are journalled in bearings 84 spaced from the open forward ends of the auger tubes 48, as shown in FIGURES 1 and 2. The pinions 80 and 82 are enclosed by a rearward inclined bottom wall 83, which extends across the housing 50 and which reaches to the rear end of the housing top wall portion 64, as indicated at 85. A damper plate 87 is pivoted at its upper end, across the interior of the housing 50, as indicated at 89, and is downwardly swingable, as indicated in FIGURE 2, to control the cross section of the open rear end 91 of the housing 50.

The single drive shaft 78 which, as shown in FIGURE 1, is located between the auger tubes 48, has slidably telescoped forward and rear sections 88 and 90, which have universal joints 92 and 94, which are connected to a gear-box 96 and the pinion 82, respectively. The gear-box 96 is mounted on a cross member 98 which is fixed, at its ends, as indicated at 100, to the top walls of the auger tubes 48, at locations near to and spaced rearwardly from their forward ends. The gear box 96 has a forwardly extending telescopic driven shaft 102 which is connected, at its rear end, by a universal joint 104 to the gear box 96, and has a forward universal joint 106, adapted to be connected to a power take-off shaft of an associated tractor.

The gear box 96 has a transverse shaft 108, on opposite ends of which are fixed pulleys 110 and 112. A rearwardly extending belt 114 is trained over the pulley 110 and over the pulley 115 of a blower 116 which is mounted between and below the auger tubes 48, on a cross member 118 fixed to their bottom walls. A forwardly extending belt 120 is trained over the gear box pulley 112 and over a pulley 122 on the transverse shaft 124 of a cotton plant stalk cleaner rotor 126. The shaft 124 has another pulley 128 thereon which is connected by a belt 130 to a pulley 132 on the shaft 134 of feeder rotors 136, which are positioned above and slightly to the rear of the cleaner rotors 126.

The blower 116 has blower tubes 138 which extend rearwardly along the undersides of the auger tubes 48 and open, at their rear ends, into the lower part of the chamber 50, for blowing cotton bolls B out of the open rear end of the chamber 50 in the receiving-vehicle body 24.

Suitably fixed to the auger tubes 48, at their lower ends, are relatively heavy rigid upstanding forwardly inclined mounting plates 140, on which the lower auger screw shaft bearings 84 are mounted, and to whose ends are suitably fixed the vertical parallel outer and inner side walls 142 and 144, respectively, of gathering scoops 146 which are open at their tops and bottoms. On the upper edges of the side walls 142, 144 are upwardly and oppositely laterally outwardly angled flanges 147, which extend rearwardly and horizontally to and are fixed to related sides of the auger tubes 48, as shown in FIGURE 1. The side walls 142, 144 have rearwardly inclined lower edges 148, and on the front vertical edges of these side walls are forwardly convergent plates 150.

A horizontal cross bar 152 extends between and is fixed to the inner side walls 144 of the scoops 146, on a level spaced above the downwardly offset forward portion 38 of the central frame member 16, and a vertical hydraulic lift cylinder 154 is suitably connected at its upper end, as indicated at 156, to the middle of the cross bar 152, and, at its lower end, as indicated at 158, to a standard 160 fixed to and rising from the central member portion 38. The cylinder 154 is adapted to be actuated to tilt the gathering mechanism and the auger tubes 48, relative to the horizontal, on the axis of the axle 30, to accommodate field conditions. For holding the adjustment, relatively small diameter ground-engaging wheels 162 are journalled at 164, on the outer sides of the lower ends of rearwardly inclining levers 166, which are pivoted intermediate their ends, as at 168, on the inner side walls 144 of the scoops 146, adjacent the rear ends of the scoops, and have pin and slot connections, at their upper ends, as at 170, to the lower ends of vertical adjusting levers 172. The levers 172 are pivotally mounted, as indicated at 174 on the inward sides of the inner scoop walls 144, as indicated in FIGURE 4, and have spring pressed dogs 176 engaged with fixed toothed detent sectors 178, to be released by handles 180 pivoted on the levers.

Fixed to and extending forwardly from the mounting plates 140 are pluralities of parallel spaced stripper teeth 182, which, as shown in detail in FIGURES 5 and 6, comprise forwardly declining tooth bodies 184 having rightangled, downwardly extending, enlarged cross section rectangular brackets 186 on their rear ends. The tooth bodies 184 have upwardly tapering heads 188, on their forward ends, which are wider than the bodies, and have upstanding longitudinal stripper lugs 190 on their upper surfaces. The lugs 190 have upwardly and forwardly angled undersurfaces 191, and forwardly declining upper edges 192 which merge into intermediate portions of the upper surfaces of the heads 188, and have undercut rear edges 194. Fixed on the upper ends of the brackets 186 are inverted L-shaped retainers 196 having forwardly extending arms 198 which are spaced upwardly from the brackets, and laterally movable, self-adjusting plates 200 rest upon the tooth bodies 184 and extend therealong and have forward ends 202 engaged under the rear edges 194 of the lugs 190, and rear edges 204 which are rugged under the retainer arms 198. The pressure of cotton plant stalks S passing between adjacent stripper teeth 182 is adapted to shift the plates 200 laterally relative to the tooth bodies 184, as required. The brackets 186 are secured to the forward sides of the mounting plates 140, as by means of spaced bolt shanks 206 extending through retaining plates 208, secured the plates 140, with nuts 210 on the shanks engaging the plates 208.

The cleaner rotors 126 are disposed beneath the stripper teeth bodies 184 and adjacent to their brackets 186, their common shaft 124 being journalled in bearings 212 and 214 on the scoop side walls 142 and 144, as shown in FIGURE 4. The cleaner rotors 126, as shown in FIGURES 8 and 9, comprise elongated hubs 216 which are fixed on the shaft 124, and radial, right angularly related plates 218, extending along the hubs, which have equally longitudinally spaced triangular teeth 220, on their outer edges, which operate to pull stalks from between adjacent stripper teeth 182, as the rotor 126 is rotated, counterclockwise, for clearing out material which might otherwise lodge therebetween.

The feeder rotors 136 are disposed within the scoops 146, above and at the rear ends of the stripper teeth 182 and operate to throw stripped bolls B into the lower ends of the auger tubes 48, to be moved upwardly and rearwardly therein by the auger screws 49 and deposited in the housing 50, from which they are blown, by air from the blower tubes 138, into the receiving vehicle 12. The shaft 134 common to the feeder rotors 136 is journalled through the scoops 146 in bearings 222 and 224 on their side walls 142 and 144, respectively. The feeder rotors 136 comprise diametrically opposed reverse curved fingers 226 which are spaced along the shaft 134 with their tips or ends positioned in the spaces between adjacent stripper teeth plates 200 but on a level slightly thereabove, as shown in FIGURE 4, with the rotors 136 turning counterclockwise, as indicated in FIGURES 2 and 3.

It will be understood from the foregoing that as the machine 10 is pulled forwardly over ground G on which is a stand of cotton plants P, the stalks S of the plants are gathered into the scoops 146 and pass between adjacent stripper teeth 182, with the result that the bolls B are stripped by the stripper plates 200 from the plants and are pushed to the lower ends of the auger tubes 48 and the auger screws, by the rotors 136. The auger screws 49 then carry the bolls B upwardly and rearwardly along the tubes 48, in the process of which debris present among the bolls falls out of the tubes 48 through the gratings 59. As the cleaned bolls emerge into the housing 50, from the elevated rear ends of the tubes 48, they are met by currents of air issuing from the rear ends of the blower tubes 138, and are blown rearwardly out of the open rear end of the housing 50 into the receiving vehicle 12. It is to be noted that there are no components within the auger tubes 48 which can materially slow up the travel of the bolls B therein, and that there are no things in the tubes which can become clogged and require stopping operation of the machine for serving, cleaning, or replacement thereof. As a result, the transit of the bolls B from the plants P is rapid and uninterrupted, and the machine can operate indefinitely without interruption.

Although there has been shown and described herein a preferred form of the invention it is to be understood that the invention is not necessarily confined thereto, and that any change or changes in the structure of and in the relative arrangements of components thereof are contemplated as being within the scope of the invention as defined by the claims appended hereto.

What is claimed is:

1. A cotton stripper comprising a wheeled horizontal frame having forward and rear ends, a pair of laterally spaced auger tubes mounted lengthwise on the frame and inclined rearwardly relative to the frame, said tubes having open forward and rear ends and having auger screws therein having shafts, a common discharge housing mounted on and communicating with the rear ends of the auger tubes, said housing having an open rear end, a blower supported between the auger tubes, blower tubes leading rearwardly from the blower along the auger tubes and having open rear ends located at the rear ends of the auger tubes, and opening into the lower part of said housing, and stripper assemblies mounted on the frame at the forward ends of the auger tubes, a single gear-box mounted between said auger tubes and having a rearwardly extending drive shaft having a rear end portion journalled in said housing and carrying a pinion, the rear ends of the auger screw shafts being journalled in said housing and having pinions in mesh with the drive shaft pinion, said gear-box having a forwardly extending drive shaft adapted to be connected to a tractor power take-off shaft, said frame having a tractor hitch on its forward end.

2. A cotton stripper comprising a wheeled horizontal frame having forward and rear ends, a pair of laterally spaced auger tubes mounted lengthwise on the frame and inclined rearwardly relative to the frame, said tubes having open forward and rear ends and having auger screws therein having shafts, a common discharge housing mounted on and communicating with the rear ends of the auger tubes, said housing having an open rear end, a blower supported between the auger tubes, blower tubes leading rearwardly from the blower along the auger tubes and having open rear ends located at the rear ends of the auger tubes and opening into the lower part of said housing, and stripper assemblies mounted on the frame at the forward ends of the auger tubes, a single gear-box mounted between said auger tubes and having a rearwardly extending drive shaft having a rear end portion journalled in said housing and carrying a pinion, the rear ends of the auger screw shafts being journalled in said housing and having pinions in mesh with the drive shaft pinion, said gear-box having a forwardly extending drive shaft adapted to be connected to a tractor power take-off shaft, said frame having a tractor hitch on its forward end, said stripper assemblies having rotary components and means operatively connecting said gear box to said components.

3. A cotton stripper comprising a wheeled horizontal frame having forward and rear ends, a pair of laterally spaced auger tubes mounted lengthwise on the frame and inclined rearwardly relative to the frame, said tubes having open forward and rear ends and having auger screws therein having shafts, a common discharge housing mounted on and communicating with the rear ends of the auger tubes, said housing having an open rear end, a blower supported between the auger tubes, blower tubes leading rearwardly from the blower along the auger tubes and having open rear ends located at the rear ends of the auger tubes and opening into the lower part of said housing, and stripper assemblies mounted on the frame at the forward ends of the auger tubes, a single gear-box mounted between said auger tubes and having a rearwardly extending drive shaft having a rear end portion journalled in said housing and carrying a pinion, the rear ends of the auger screw shafts being journalled in said housing and having pinions in mesh with the drive shaft pinion, said gear-box having a forwardly extending drive shaft adapted to be connected to a tractor power take-off shaft, said frame having a tractor hitch on its forward end, said stripper assemblies having rotary components and means operatively connecting said gear-box to said components, said stripper assemblies comprising scoops having outer and inner side walls, laterally spaced forwardly inclined stripper teeth disposed between said side walls, and rotary components comprising a transverse cleaner rotor positioned beneath and below said teeth and having teeth positioned in line with the spaces between adjacent stripper teeth, and a feeder rotor positioned above the stripper teeth and having fingers aligned with the spaces between adjacent stripper teeth.

4. A cotton stripper comprising a wheeled horizontal frame having forward and rear ends, a pair of laterally spaced auger tubes mounted lengthwise on the frame and inclined rearwardly relative to the frame, said tubes having open forward and rear ends and having auger screws therein having shafts, a common discharge housing mounted on and communicating with the rear ends of the auger tubes, said housing having an open rear end, a blower supported between the auger tubes, blower tubes leading rearwardly from the blower along the auger tubes and having open rear ends located at the rear ends of the auger tubes and opening into the lower part of said housing, and stripper assemblies mounted on the frame at the forward ends of the auger tubes, a single gear-box mounted between said auger tubes and having a rearwardly extending drive shaft having a rear end portion journalled in said housing and carrying a pinion, the rear ends of the auger screw shafts being journalled in said housing and having pinions in mesh with the drive shaft pinion, said gear-box having a forwardly extending drive shaft adapted to be connected to a tractor power take-off shaft, said frame having a tractor hitch on its forward end, said stripper assemblies having rotary components and means operatively connecting said gear-box to said components, said stripper assemblies comprising scoops having outer and inner side walls, laterally spaced forwardly inclined stripper teeth disposed between said side walls, and rotary components comprising a transverse cleaner rotor positioned beneath and below said teeth and having teeth positioned in line with the spaces between adjacent stripper teeth, and a feeder rotor positioned above the stripper teeth and having fingers aligned with the spaces between adjacent stripper teeth, cross bars extending between upper parts of said scoop side walls and spaced above said frame, vertically extensible lift members extending between and articulated to said cross bars and the frame, said auger tubes being transversely pivoted on the frame, vertical levers pivoted intermediate their ends on the inner scoop side walls and extending therebelow and carrying ground-engaging wheels on their lower ends, adjusting levers pivoted intermediate their ends on the inner side walls and having lower ends articulated to the upper ends of the wheel levers, and means for locking the adjusting levers in adjusted positions determined by operations of the lift members.

5. A cotton stripper comprising a wheeled horizontal frame having forward and rear ends, a pair of laterally spaced auger tubes mounted lengthwise on the frame and inclined rearwardly relative to the frame, said tubes having open forward and rear ends and having auger screws therein having shafts, a common discharge housing mounted on and communicating with the rear ends of the auger tubes, said housing having an open rear end, a blower supported between the auger tubes, a blower tube leading rearwardly from the blower along the auger tubes and having open rear ends located at the rear ends of the auger tubes and opening into the lower part of said housing, and stripper assemblies mounted on the frame at the forward ends of the auger tubes, a single gear-box mounted between said auger tubes and having a rearwardly extending drive shaft having a rear end portion journalled in said housing and carrying a pinion, the rear ends of the auger screw shafts being journalled in said housing and having pinions in mesh with the drive shaft pinion, said gear-box having a forwardly extending drive shaft adapted to be connected to a tractor power take-off shaft, said frame having a tractor hitch on its forward end, said auger tubes being in rearwardly convergent relationship with their rear ends entering said common discharge housing in side by side relation, and means enclosing the pinions and spaced from the bottom of the housing.

6. A cotton stripper comprising a wheeled horizontal frame having forward and rear ends, a pair of laterally spaced auger tubes mounted lengthwise on the frame and inclined rearwardly relative to the frame, said tubes having open forward and rear ends and having auger screws therein having shafts, a common discharge housing mounted on and communicating with the rear ends of the auger tubes, said housing having an open rear end, a blower supported between the auger tubes, blower tubes leading rearwardly from the blower along the auger tubes and having open rear ends located at the rear ends of the auger tubes and opening into the lower part of said housing, and stripper assemblies mounted on the frame at the forward ends of the auger tubes, said stripper assemblies comprising scoops having open tops and open bottoms, and vertical outer and inner side walls, mounting plates fixed to and extending across the forward ends of the scoops, transverse feeder rotors mounted on the scoops above the mounting plates, transverse cleaner rotors mounted across the scoops in front of and on a level with said mounting plates, and pluralities of laterally spaced stripper teeth mounted on and extending forwardly from said mounting plates between the feeder and cleaner rotors, said stripper teeth being forwardly inclined relative to the horizontal.

7. A cotton stripper comprising a wheeled horizontal frame having forward and rear ends, a pair of laterally spaced auger tubes mounted lengthwise on the frame and inclined rearwardly relative to the frame, said tubes having open forward and rear ends and having auger screws therein having shafts, a common discharge housing mounted on and communicating with the rear ends of the auger tubes, said housing having an open rear end, a blower supported between the auger tubes, blower tubes leading rearwardly from the blower along the auger tubes and having open rear ends located at the rear ends of the auger tubes and opening into the lower part of said housing, and stripper assemblies mounted on the frame at the forward ends of the auger tubes, said stripper assemblies comprising scoops having open tops and open bottoms, and vertical outer and inner side walls, mounting plates fixed to and extending across the forward ends of the scoops, transverse feeder rotors mounted on the scoops above the mounting plates, transverse cleaner rotors mounted across the scoops in front of and on a level with said mounting plates, and pluralities of laterally spaced stripper teeth mounted on and extending forwardly from said mounting plates between the feeder and cleaner rotors, said stripper teeth being forwardly inclined relative to the horizontal, said stripper teeth comprising brackets fixed to the forward sides of the mounting plates, tooth bodies extending forwardly at right angles from the brackets.

8. A cotton stripper comprising a wheeled horizontal frame having forward and rear ends, a pair of laterally spaced auger tubes mounted lengthwise on the frame and inclined rearwardly relative to the frame, said tubes having open forward and rear ends and having auger screws therein having shafts, a common discharge housing mounted on and communicating with the rear ends of the auger tubes, said housing having an open rear end, a blower supported between the auger tubes, blower tubes leading rearwardly from the blower along the auger tubes and having open rear ends located at the rear ends of the auger tubes and opening into the lower part of said housing, and stripper assemblies mounted on the frame at the forward ends of the auger tubes, said stripper assemblies comprising scoops having open tops and open bottoms, and vertical outer and inner side walls, mounting plates fixed to and extending across the forward ends of the scoops, transverse feeder rotors mounted on the scoops above the mounting plates, transverse cleaner rotors mounted across the scoops in front of and on a level with said mounting plates, and pluralities of laterally spaced stripper teeth mounted on and extending forwardly from said mounting plates between the feeder and cleaner rotors, said stripper teeth being forwardly inclined relative to the horizontal, said stripper teeth comprising brackets fixed to the forward sides of the mounting plates, tooth bodies extending forward at right angles from the brackets, self-adjusting laterally movable stripper plates overlying and supported on said tooth bodies, said plates having forwardly converging side edges, and means precluding endwise shifting of the stripper plates relative to the tooth bodies.

9. A cotton stripper comprising a wheeled horizontal frame having forward and rear ends, a pair of laterally spaced auger tubes mounted lengthwise on the frame and inclined rearwardly relative to the frame, said tubes having open forward and rear ends and having auger screws therein having shafts, a common discharge housing mounted on and communicating with their rear ends of the auger tubes, said housing having an open rear end, a blower supported between the auger tubes, blower tubes leading rearwardly from the blower along the auger tubes and having open rear ends located at the rear ends of the auger tubes and opening into the lower part of said housing, and stripper assemblies mounted on the frame at the forward ends of the auger tubes, said stripper assemblies comprising scoops having open tops and open bottoms, and vertical outer and inner side walls, mounting plates fixed to and extending across the forward ends of the scoops, transverse feeder rotors mounted on the scoops above the mounting plates, transverse cleaner rotors mounted across the scoops in front of and on a level with said mounting plates, and pluralities of laterally spaced stripper teeth mounted on and extending forwardly from said mounting plates between the feeder and cleaner rotors, said stripper teeth being forwardly inclined relative to the horizontal, said stripper teeth comprising brackets fixed to the forward sides of the mounting plates, tooth bodies extending forward at right angles from the brackets, self-adjusting laterally movable stripper plates overlying and supported on said tooth bodies, said plates having forwardly converging side edges, and means precluding endwise shifting of the stripper plates relative to the tooth bodies, said tooth bodies having enlarged width forwardly tapered heads on their forward ends whose sides serve to guide plant stalks into the spaces between adjacent tooth bodies and stripper plates.

References Cited in the file of this patent

UNITED STATES PATENTS

| | | |
|---|---|---|
| 2,517,063 | Wallace | Aug. 1, 1950 |
| 2,544,411 | Altgelt | Mar. 6, 1951 |
| 2,654,201 | Hyman | Oct. 6, 1953 |
| 2,691,862 | Johnson | Oct. 19, 1954 |
| 2,861,298 | Fowler | Nov. 25, 1958 |